United States Patent

Broden et al.

[11] Patent Number: 6,151,557
[45] Date of Patent: Nov. 21, 2000

[54] FRICTION FLOWMETER WITH IMPROVED SOFTWARE

[75] Inventors: David A. Broden, Minnetrista; David E. Wiklund, Eden Prairie, both of Minn.

[73] Assignee: Rosemount Inc., Eden Prairie, Minn.

[21] Appl. No.: 09/006,452

[22] Filed: Jan. 13, 1998

[51] Int. Cl.$^7$ ................................ G01F 1/00; G01F 1/34
[52] U.S. Cl. ........................ 702/47; 702/50; 73/861.42
[58] Field of Search ................................ 702/45, 47, 46, 702/48, 49, 50, 51, 98, 99, 54, 55, 100, 101, 113, 114, 130, 137, 138, 140; 73/861.42, 861.47

[56] References Cited

U.S. PATENT DOCUMENTS

| | | |
|---|---|---|
| 1,146,409 | 7/1915 | Dolbey . |
| 1,229,718 | 6/1917 | Cole . |
| 2,098,574 | 11/1937 | Doyle ........................................ 73/206 |
| 2,276,580 | 3/1942 | Hofer ........................................ 73/205 |
| 3,396,406 | 8/1968 | Billeter et al. . |
| 3,407,658 | 10/1968 | Kerbow et al. ........................... 702/47 |
| 4,335,605 | 6/1982 | Boyd ........................................ 702/45 |
| 4,361,050 | 11/1982 | Coussot et al. ....................... 73/861.47 |
| 4,453,417 | 6/1984 | Moyers ................................. 73/861.42 |
| 5,606,513 | 2/1997 | Louwagie et al. ...................... 364/510 |
| 5,861,561 | 1/1999 | Van Cleve et al. .................. 73/861.52 |

FOREIGN PATENT DOCUMENTS

| | | |
|---|---|---|
| 0027402 | 4/1981 | European Pat. Off. . |
| 1573044 | 3/1970 | Germany . |
| 24 28487 | 1/1975 | Germany . |
| 4200803 | 7/1993 | Germany . |
| 19648591 | 2/1998 | Germany . |
| 19635789 | 5/1998 | Germany . |
| 6-94490 | 4/1994 | Japan . |
| 6-137914 | 5/1994 | Japan . |

OTHER PUBLICATIONS

K.L. Wehmeyer: "Toner Manufacture", IBM Technical Disclosure Bulletin, vol. 24, No. 1A, Jun., 1981, pp. 421–422.

O. Fiedler: "Strömungs—und Durchflussmesstechnik", R Oldenbourg Verlag, München Wien XP002098805 228260, 1992, pp. 95–98.

*Primary Examiner*—Marc S. Hoff
*Assistant Examiner*—Manuel L. Barber
*Attorney, Agent, or Firm*—Westman, Champlin & Kelly, PA

[57] ABSTRACT

A method in a pressure transmitter and a pressure transmitter for determining a mass flow rate of a fluid in a conduit measure a differential pressure between two points in the fluid, where the conduit has a substantially constant cross-sectional area between the two points. In one aspect, the mass flow rate is calculated by multiplying the square-root of the differential pressure by a mass flow constant.

6 Claims, 6 Drawing Sheets

FRICTION FLOWMETER WITH IMPROVED SOFTWARE

REFERENCE TO CO-PENDING APPLICATION

This application is related to a U.S. application filed on even date herewith entitled FRICTION FLOWMETER. Both applications are owned by a common assignee.

BACKGROUND OF THE INVENTION

The present invention relates to transmitters for process control. In particular, the present invention relates to pressure transmitters which measure flow.

In process control, fluid movement through pipes is monitored by a series of process control transmitters connected to the pipes. The transmitters contain sensors that sense the difference between two pressures in a pipe (i.e. a differential pressure) From the differential pressure measurement, these transmitters infer the mass flow rate of the fluid in the pipe.

Generally, transmitters sense the differential pressure across an obstruction in the pipe. A typical obstruction is an orifice plate, which is a perforated disk inserted into the pipe. Although such disks provide a large and easily sensed pressure drop, they complicate the mass flow rate calculation because a number of compensation factors must be added to the calculation to account for fluid flow disruptions created by the disk. The disks also cause a substantial loss in pressure in the pipe. This reduction in pressure constitutes a needless and costly waste of energy.

SUMMARY OF THE INVENTION

A method in a pressure transmitter and a pressure transmitter for determining a mass flow rate of a fluid in a conduit measure a differential pressure between two points in the fluid, where the conduit has a substantially constant cross-sectional area between the two points. In one aspect, the mass flow rate is calculated by multiplying the square-root of the differential pressure by a mass flow constant.

DETAILED DESCRIPTION OF THE PREFERRED EMBODIMENTS

One aspect of the present invention eliminates the need for orifice plates in the pipe by accurately sensing the pressure drop that occurs along a section of pipe free of internal obstructions and having a substantially constant cross-section. Based on this accurate measurement, the present invention uses novel techniques to produce digital values related to the fluid flow.

Figure 1:
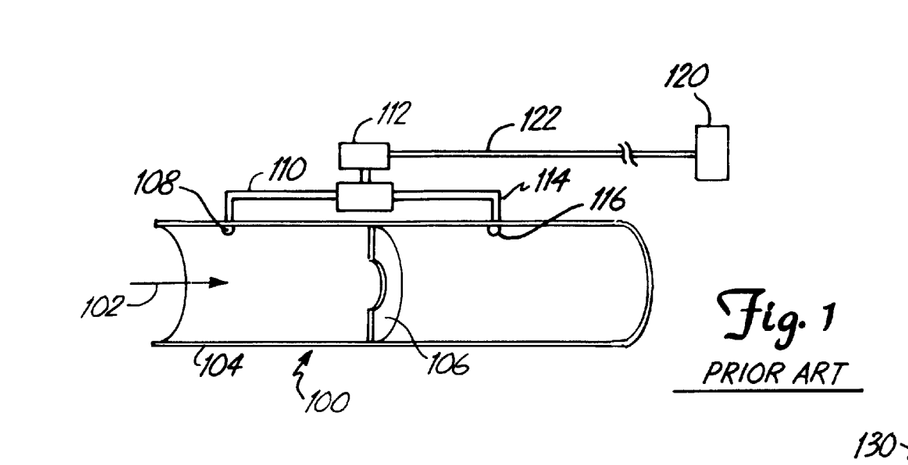
FIG. 1 is a pressure measuring system of the prior art.

FIG. 1 shows a prior art pressure measuring system 100. A fluid flows in direction 102 through pipe 104, which contains orifice plate 106. Upstream from orifice plate 106, aperture 108 provides fluid communication between pipe 104 and conduit 110. Conduit 110 extends from aperture 108 to transmitter 112 and second conduit 114 extends from transmitter 112 to downstream aperture 116. Sensors in transmitter 112 form a differential pressure signal indicative of the pressure difference between aperture 108 and aperture 116. This differential pressure signal is communicated to control room 120 through process control lines 122.

The pressure drop created by orifice plate 106 is relatively large, making it easier for sensors in transmitter 112 to accurately measure the pressure difference between the two ports. However, this large pressure drop represents a significant and costly energy loss because energy is required to pressurize the fluid. Moreover, since there are sometimes tens of transmitters monitoring mass flow rate on a single length of pipe, the added pressurization for each orifice plate is multiplied by the total number of transmitters and results in a large, costly, and unnecessary waste of energy.

In addition, to insert the transmitter of the prior art into a pipe, a section of pipe has to be removed so that the orifice plate may be inserted. This is a costly procedure that increases the possibility of leaks in the pipe system.

Orifice plates are also undesirable because certain process flows include matter that tends to become trapped in the orifice plate. This causes additional maintenance and increases the wasteful pressure drop of the orifice plate. Such plate contamination also decreases the accuracy of the flow rate measurement made by transmitters of the prior art.

Figure 2:
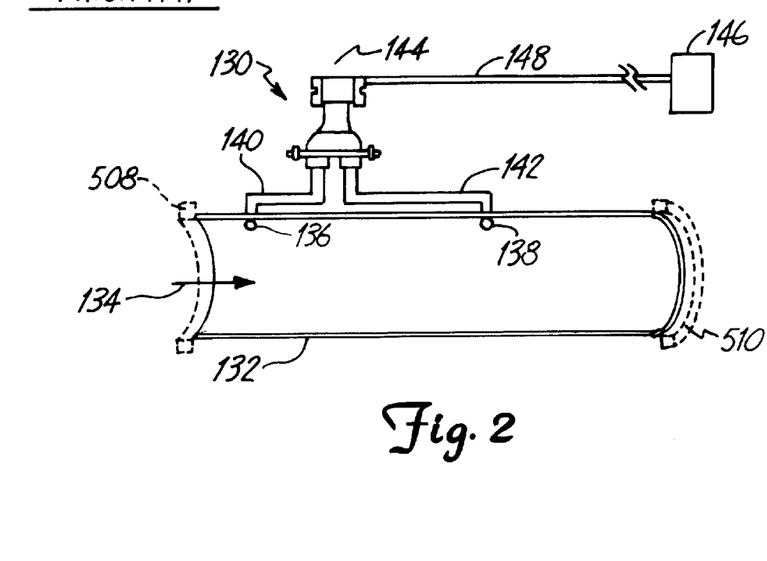
FIG. 2 is a first embodiment of a pressure measuring system of the present invention.

FIG. 2 shows a pressure measuring system 130 of the present invention. Pipe 132 carries a fluid flowing in direction 134 past apertures 136 and 138. Apertures 136 and 138 provide openings to impulse pipes 140 and 142, respectively. Impulse pipes 140 and 142, preferably matched, are connected to transmitter 144, which contains a differential pressure sensor (shown in detail below). Transmitter 144 may comprise any type of "transmitter" as the term is used in the process control industry such as the model 1151 or model 3051 transmitters available from Rosemount Inc. of Eden Prairie, Minn. The differential pressure sensor produces a differential pressure signal which is communicated from transmitter 144 to control room 146 through process control loop 148. Loop 148 can operate in accordance with various industry standards such as 4–20 mA, HART®, Field-Bus, ProfiBus, etc. In one embodiment, transmitter 144 is completely powered by power received from loop 148.

One aspect of a transmitter in accordance with the invention includes a recognition that due to friction between the fluid and the pipe, there is a linear pressure drop from aperture 136 to aperture 138 and that the square root of this pressure drop is proportional to the velocity of the fluid.

Figure 3:
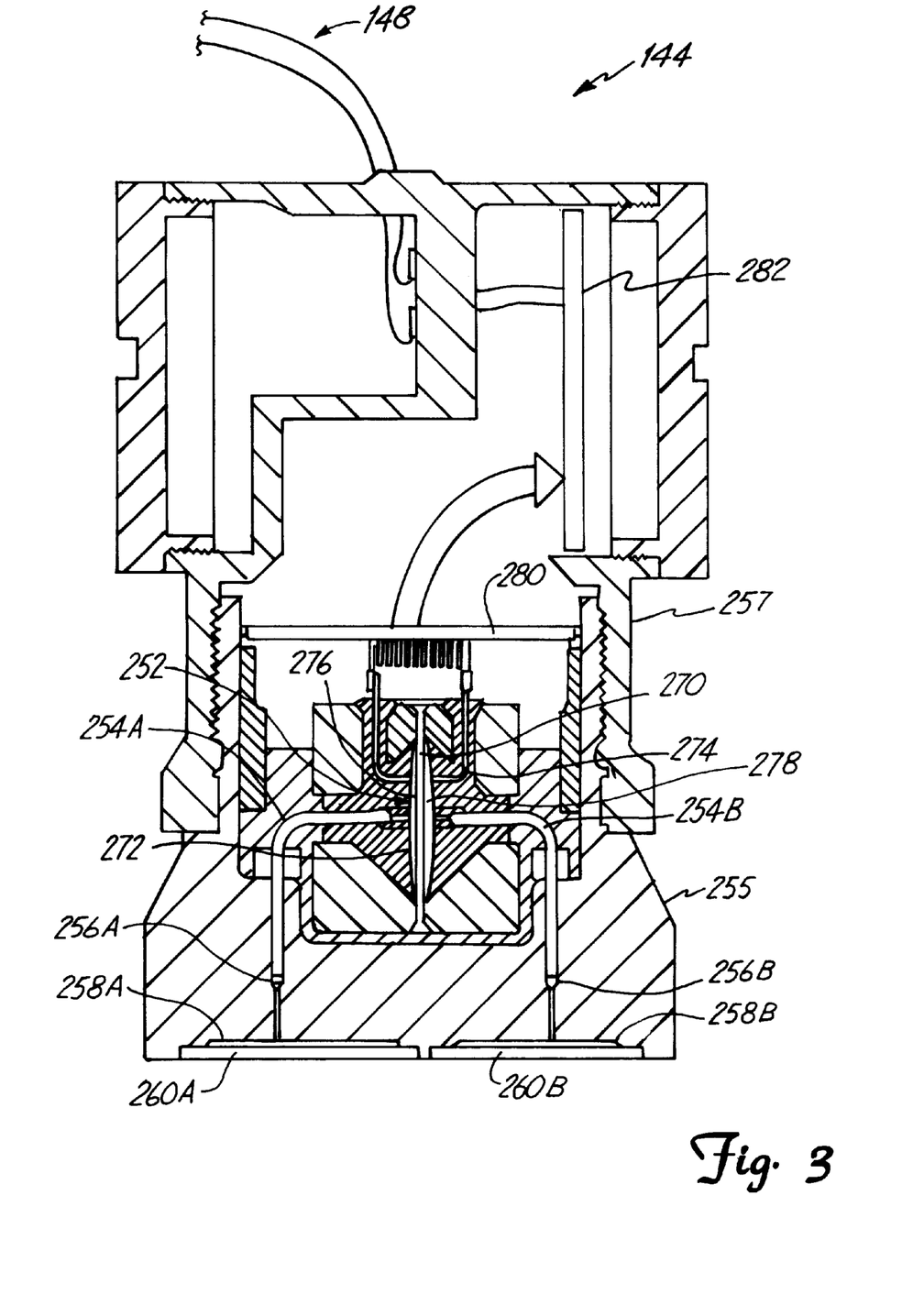
FIG. 3 is a cross-sectional view of a pressure transmitter that can be used with the present invention.

FIG. 3 shows a cross-section of coplanar transmitter 144 of FIG. 2. Transmitter 144 has two isolator diaphragms 260A and 260B that are in fluid communication with impulse piping 140 and 142 (not shown in FIG. 3). Isolator diaphragms 260A and 260B transmit the pressure in impulse piping 140 and 142, respectively, to two fluid communication channels, formed by chambers 258A, 258B, respectively, passageways 256A, 256B, respectively and inlet tubes 254A, 254B, respectively. Differential pressure sensor 252 is positioned between inlet tubes 254A, 254B, and includes sensing diaphragm 270 welded between capacitive plates 272, 274, which form chambers 276, 278, respectively. Pressure differences between chambers 276, 278 cause sensing diaphragm 270 to deflect thereby changing the capacitances between capacitive plates 272, 274 and sensing diaphragm 270. Sensor board 280 compensates signals that are based on these capacitances and output circuit board 282 produces related outputs on process control loop 148.

Figure 4:
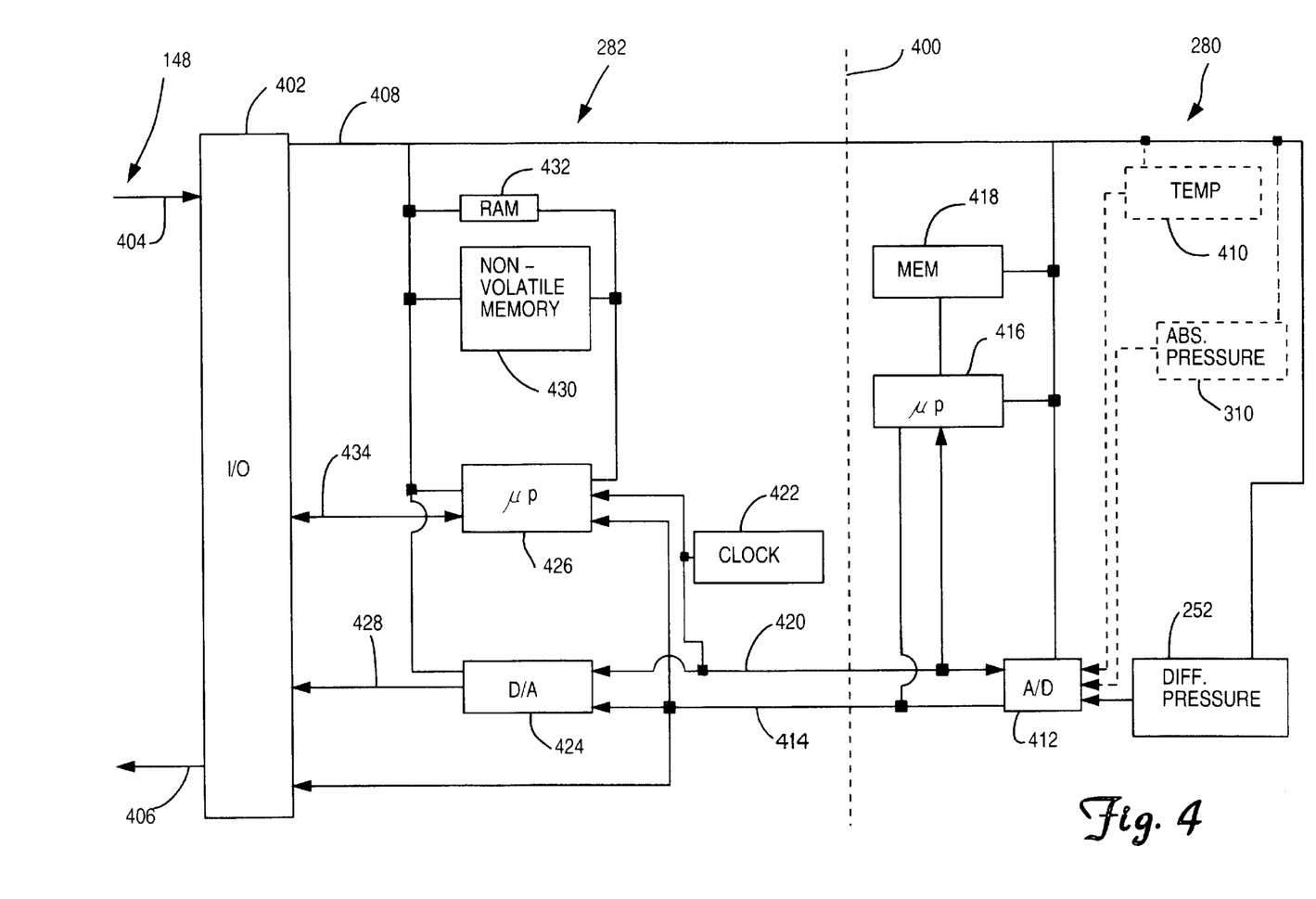
FIG. 4 is a block diagram of a conditioning circuit associated with the transmitter of FIG. 3.

FIG. 4 is a block diagram of electronics on sensor board 280 and output circuit board 282. Electronic components to the left of broken line 400 in FIG. 4 are located on output circuit board 282, whereas components to the right of line 400 are located on sensor board 280. Sensor board 280 is located in sensor housing 255 of transmitter 144, and output circuit board 282 is located in electronics module 257 of transmitter 144.

Output circuit board 282 includes input/output circuit 402 that converts power from control loop 148, consisting of lines 404 and 406 in FIG. 4, into a power supply on bus 408. Analog-to-digital converter 412 is connected to differential pressure sensor 252 and provides a digital output 414 to microprocessor 416. In alternative embodiments, analog-to-digital converter 412 receives signals from temperature sensor 410 and absolute pressure sensor 310. A memory 418 preferably stores information about the sensor and sensor board 280. The system operates in accordance with clock signal 420 from clock 422. If the output of transmitter 144 is analog, digital-to-analog converter 424 converts digital signals on bus 414 into analog signals that pass to input/output circuitry 402 along analog line 428. If the output of transmitter 144 is digital as in the Fieldbus protocol, or is a mix of analog and digital as in the HART protocol, the digital signals on bus 414 pass directly to input/output circuitry 402.

Microprocessor 426 receives digital signals on bus 414 and is connected to non-volatile memory 430 and random access memory 432. Microprocessor 426 also receives digital signals along bi-directional bus 434 from input/output circuitry 402. Examples of the digital signals received from input/output circuitry 402 include signals representative of the pipe's diameter, and the pipe's relative roughness, which can be used in calculating mass flow rate as discussed below.

One of the benefits of the present invention is that it facilitates mass flow rate calculations that use fewer empirically determined terms and thus produce more accurate results. In the past, mass flow rate was calculated using an orifice plate and the equation:

$$Q_{mass} = NC_d EY_1 d^2 \sqrt{(\Delta P) \rho} \quad \text{Equation 1}$$

Where Q is the mass flow rate; N is a units conversion factor; $C_d$ is a discharge coefficient; E is a velocity of approach factor; $Y_1$ is a gas expansion factor; d is a bore of the differential producer; $\rho$ is fluid density; and $\Delta P$ is the differential pressure measured by the differential pressure sensor. Many of these terms must be adjusted to accommodate the particular fluid in the pipe, and some require continuous refinement to accommodate changes in the temperature or static pressure of the fluid.

Without the orifice plate, several factors are eliminated from equation 1. In particular, E, the velocity of approach factor; $Y_1$, the gas expansion factor; and d, the bore of the differential producer, are each a constant under the present invention. Thus, the equation for mass flow rate under the present invention reduces to:

$$Q_{mass} = C_d k_1 \sqrt{(\Delta P) \rho} \quad \text{Equation 2}$$

Where $k_1$ is a constant; $C_d$ is a friction factor coefficient; $\Delta P$ is the differential pressure; and $\rho$ is the fluid density.

In prior art systems, the discharge coefficient, $C_d$, is a function of the shape of the bore in the orifice plate, as well as the velocity, density, and viscosity of the flow. In the present invention, the discharge coefficient is converted into a friction factor coefficient, that is a function of a Reynolds number and the friction factor for the pipe.

Figure 5:
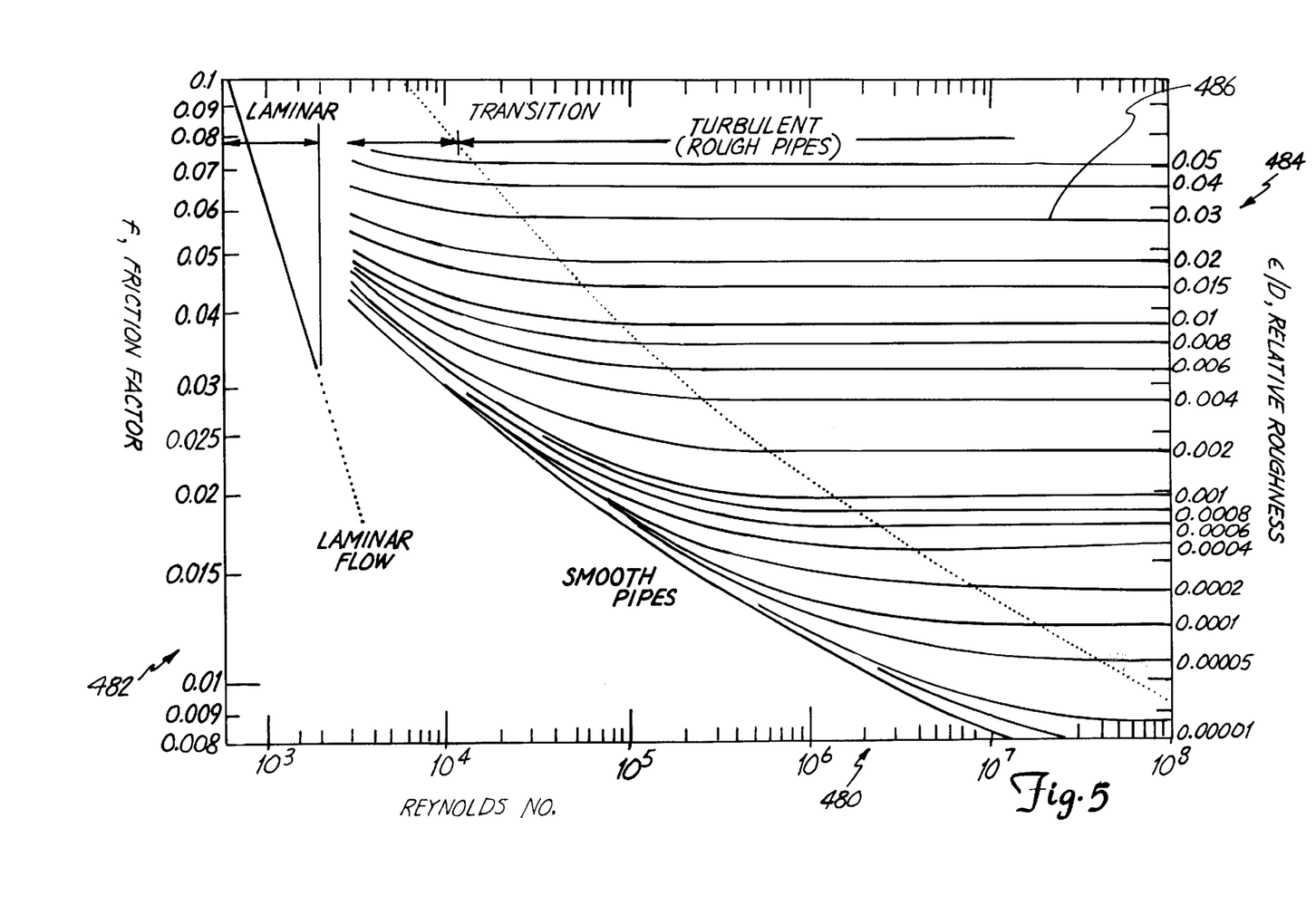
FIG. 5 is a graph of Reynolds Number as a function of friction factor and pipe roughness.

As shown in the graph of FIG. 5, the friction factor is related to the Reynolds number and to the relative roughness of the pipe. In FIG. 5 the Reynolds number is shown on horizontal axis 480, the friction factor is shown on left-hand vertical axis 482, and the relative roughness of the pipe is shown on right-hand vertical axis 484. For small Reynolds numbers, those below $5 \cdot 10^3$, the relationship between friction factor and the Reynolds number is linear and independent of the relative roughness of the pipe. For higher Reynolds numbers, the relationship between the friction factor and the Reynolds number depends on the relative roughness of the pipe. This relationship can be stored in the transmitter in a look-up table or calculated based on an empirical equation.

In FIG. 5, several different lines representing different relationships between friction factor and the Reynolds number are shown for different relative roughnesses. For example, line 486 shows a relationship between friction factor and Reynolds number at a relative pipe roughness of 0.03.

The Reynolds number is a function of the mass flow rate and can be calculated using the following equation:

$$R_D = \frac{4Q}{\pi D \mu} \quad \text{Equation 3}$$

Where $R_D$ is the Reynolds number; Q is the mass flow rate; $\pi$ is a mathematical constant; D is the inner diameter of the pipe; and $\mu$ is the viscosity of the fluid.

Figure 6:
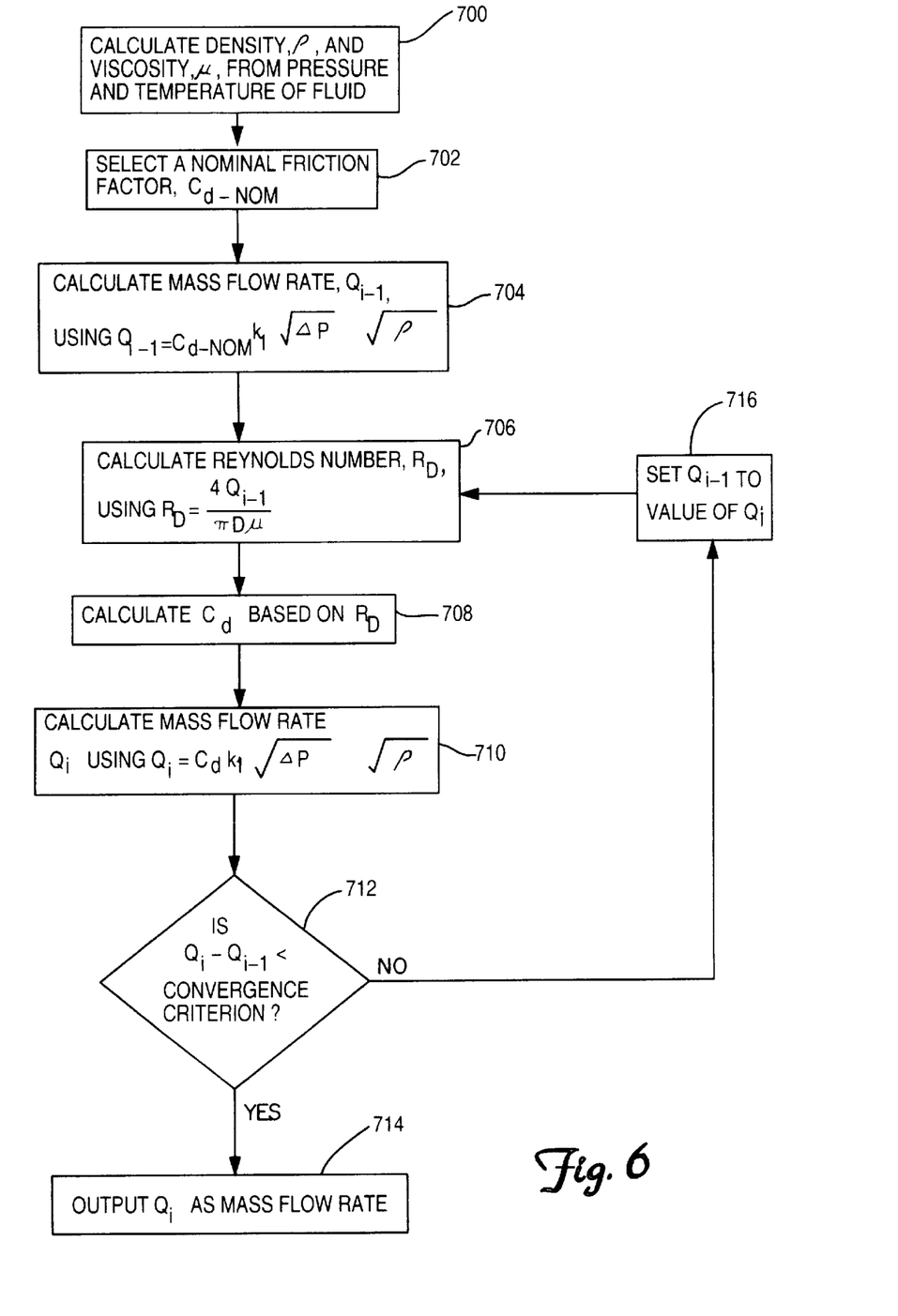
FIG. 6 is a flow diagram of a first embodiment of a method for calculating mass flow rate under the present invention.

Because of the interdependence of their variables, Equations 2 and 3 may be solved through an iterative approach, which is shown in the flow diagram of FIG. 6. First step 700 calculates the density, $\rho$, and viscosity, $\mu$, from the pressure and temperature of the fluid. Next, a nominal friction factor coefficient is selected at step 702. This nominal value is chosen based on expected friction factor coefficients for the particular fluid flow. Step 704 calculates the mass flow rate, $Q_{i-1}$, using the nominal friction factor coefficient and the equation:

$$Q_{i-1} = C_{d-nom} k_1 \sqrt{\Delta P} \sqrt{\rho} \quad \text{Equation 4}$$

Where $Q_{i-1}$ is a mass flow rate; $C_{d-nom}$ is the nominal friction factor coefficient; $k_1$ is a constant; $\Delta P$ is a differential pressure; and $\rho$ is the density of the fluid.

The Reynolds number, $R_D$, is calculated in step 706 using Equation 3 and $Q_{i-1}$ of Equation 4. Based on the calculated $R_D$ and an empirical or theoretical relationship between $R_D$ and the friction factor coefficient, $C_d$, step 708 calculates a value for friction factor coefficient, $C_d$.

Step 710 calculates a current mass flow rate, $Q_i$, using Equation 2 and the calculated friction factor coefficient $C_d$. Decision step 712 compares a convergence criteria to the difference between the current mass flow rate, $Q_i$, and the previously calculated mass flow rate, $Q_{i-1}$. If the difference between the current mass flow rate and the last calculated mass flow rate is less than the convergence criteria, the current mass flow rate, $Q_i$, is output as the calculated flow rate at step 714. If the difference between the two mass flow rates is not less than the convergence criteria, the value of the current mass flow rate is assigned as the previous mass flow rate, $Q_{i-1}$, in step 716 and steps 706, 708, 710, and 712 are repeated.

Figure 7:
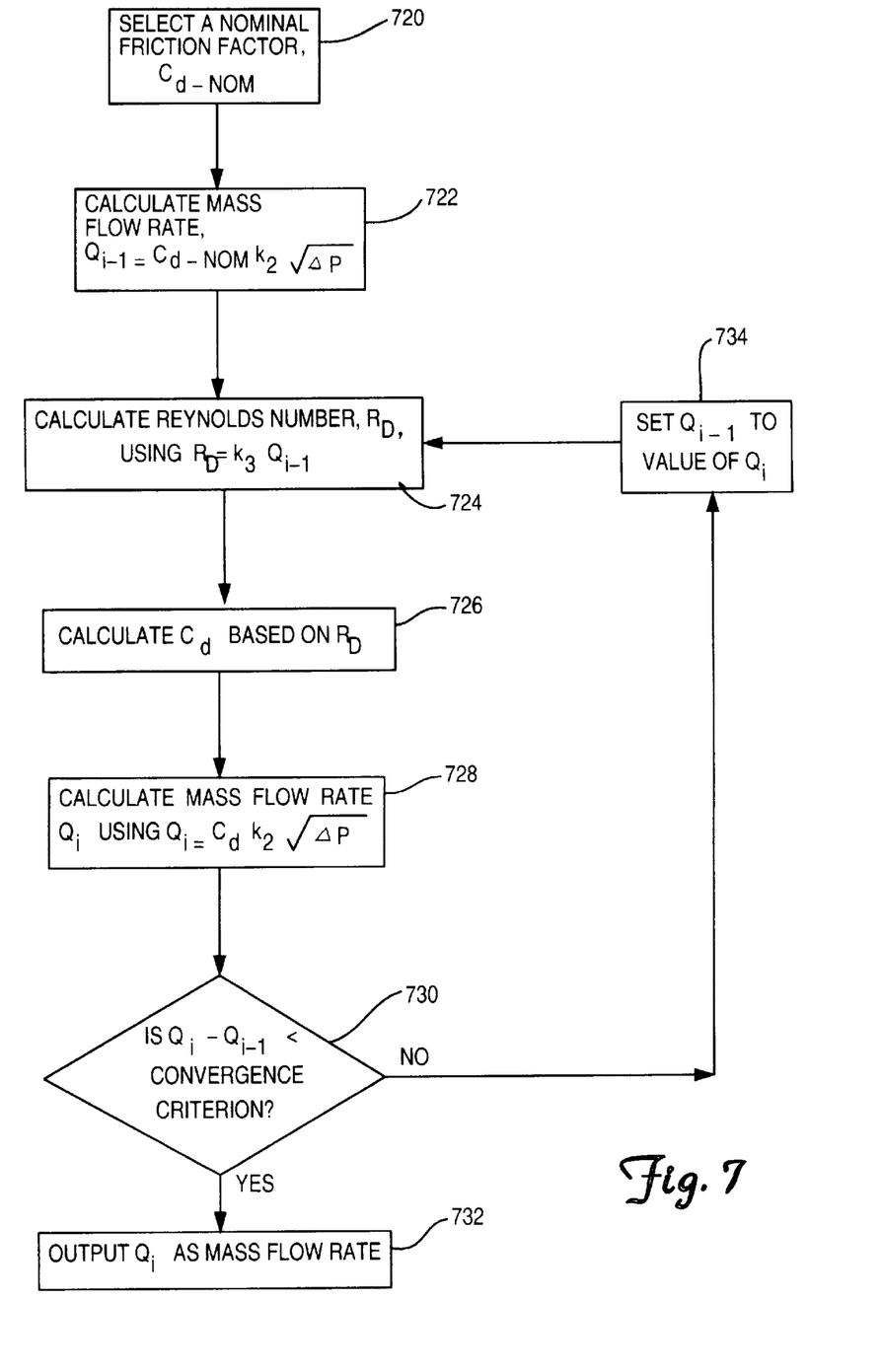
FIG. 7 is a flow diagram of a second embodiment of a method for calculating mass flow rate under the present invention.

To further simplify calculations, the density and viscosity can be assumed to be constant. A flow diagram of a method for calculating the mass flow rate when assuming constant density and viscosity is shown in FIG. 7, where a nominal friction factor coefficient is selected in step 720. This nominal friction factor coefficient is used to calculate a mass flow rate, $Q_{i-1}$, in step 722 using the equation:

$$Q_{i-1} = C_{d-nom} k_2 \sqrt{\Delta P} \qquad \text{Equation 5}$$

Where $C_{d-nom}$ is the nominal friction factor coefficient; $K_2$ is a constant; and $\Delta P$ is the differential pressure. The specific value of $K_2$ depends on many factors including the inner diameter of the pipe and the distance between differential pressure ports. In step 724, the calculated mass flow rate, $Q_{i-1}$, is used to calculate a Reynolds number, $R_D$, using the following equation:

$$R_D = k_3 Q_{i-1} \qquad \text{Equation 6}$$

Where $K_3$ is a constant that is equal to four divided by the product of the viscosity of the flow, the inner diameter of the pipe and $\pi$.

Based on the calculated $R_D$, a friction factor coefficient, $C_d$, is calculated in step 726. The friction factor coefficient can either be based on an empirical relationship or on a theoretical relationship between $R_D$ and $C_d$. Once $C_d$ is calculated, a current mass flow rate, $Q_i$, is calculated in step 728 using the equation:

$$Q_i = C_d k_2 \sqrt{\Delta P} \qquad \text{Equation 7}$$

Where $K_2$ is the same constant used in Equation 5.

In decision box 730, the current mass flow rate, $Q_i$, is compared to the previous mass flow rate, $Q_{i-1}$, to determine if the difference between the two is less than a convergence criteria. If the difference is less than the convergence criteria, the current mass flow rate, $Q_i$, is output as the mass flow rate in step 732. If the difference is not less than the convergence criteria, the previous mass flow rate variable, $Q_{i-1}$, is set to the value of the current mass flow rate in step 734, and steps 724, 726, 728, and 730 are repeated.

At sufficiently high Reynolds numbers, the friction factor is constant and the mass flow rate is not dependent on the Reynolds number, the viscosity or the density of the fluid. For such Reynolds numbers, the equation for calculating mass flow rate becomes:

$$Q = k_4 \sqrt{\Delta P} \sqrt{\rho} \qquad \text{Equation 8}$$

Where $\rho$ is the density, Q is the mass flow rate; $K_4$ is a constant; and $\Delta P$ is the differential pressure. Since friction factor is a constant, it is folded into constant $K_4$. No iterations are needed if the Reynolds number is considered constant.

In order to reduce the amount of computations, the transmitter can be associated with a spool of pipe that has been manufactured to have a desired relative roughness. Such a spool section is shown in outline form in FIG. 2 where two flanged ends 508 and 510 are formed on the ends of pipe 132 to allow the spool section to be dropped within and connected to an opening in a pipe line. The roughness of the spool may be produced during casting of the pipe; through abrasion, such as sand blasting; or through spiral grooves cut into all or part of the pipe surface.

Although the present invention has been described with reference to preferred embodiments, workers skilled in the art will recognize that changes may be made in form and detail without departing from the spirit and scope of the invention.

What is claimed is:

1. An apparatus for determining a mass flow rate of a fluid in a pipe, the apparatus comprising:
   a microprocessor for receiving a differential pressure signal indicative of a differential pressure value measured between two points in the fluid, the pipe having a substantially constant cross-sectional area between the two points, the microprocessor additionally for:
   determining a calculated mass flow rate by selecting a friction factor coefficient, and multiplying the square-root of the differential pressure value by a mass flow constant, and the friction factor coefficient;
   determining a change in calculated mass flow rate by:
   determining a Reynolds number based on a calculated mass flow rate;
   determining a revised friction factor coefficient based on the Reynolds number;
   multiplying the revised friction factor coefficient by the mass flow constant and the square-root of the differential pressure to produce a revised mass flow rate; and
   subtracting the revised mass flow rate from the calculated mass flow rate to produce a change in calculated mass flow rate;
   retrieving a convergence criterion from a memory;
   repeating the step of determining a change in calculated mass flow rate while using the last revised mass flow rate as the calculated mass flow rate until the change in calculated mass flow rate is less than the convergence criterion; and
   a memory, coupled to the microprocessor, for storing the mass flow constant.

2. An apparatus for determining a mass flow rate of a fluid in a pipe, the apparatus comprising:
   a microprocessor for receiving a temperature signal indicative of a temperature of the fluid, an absolute pressure signal indicative of an absolute pressure of the fluid and a differential pressure signal indicative of a differential pressure value measured between two points in the fluid, the pipe having a substantially constant cross-sectional area between the two points, the microprocessor additionally for:
   determining a calculated mass flow rate by determining a density of the fluid based on the temperature signal and absolute pressure signal; selecting a friction factor coefficient; and multiplying the square-root of the differential pressure value by a mass flow constant, the square-root of the density and the friction factor coefficient;
   determining a viscosity based on the temperature signal;
   determining a change in calculated mass flow rate by:
   determining a Reynolds number based on the viscosity and a calculated mass flow rate;
   determining a revised friction factor coefficient based on the Reynolds number;
   multiplying the revised friction factor coefficient by the mass flow constant, the square-root of the density and the square-root of the differential pressure to produce a revised mass flow rate;
   subtracting the revised mass flow rate from the calculated mass flow rate to produce a change in calculated mass flow rate;

retrieving a convergence criterion from the memory; and repeating the step of determining a change in calculated mass flow rate by using the last revised mass flow rate as the calculated mass flow rate until the change in calculated mass flow rate is less than the convergence criterion; and a memory, coupled to the microprocessor, for storing the mass flow constant.

3. A method for calculating a mass flow rate of a fluid in a conduit, the method comprising:

selecting a friction factor coefficient;

measuring a differential pressure between two points in the fluid, the conduit having a substantially constant cross-sectional area between the two points;

multiplying the square-root of the differential pressure by a mass flow constant and the friction factor coefficient to produce a calculated mass flow rate;

selecting a convergence criterion;

determining a change in calculated mass flow rate by:
   determining a Reynolds number based on a calculated mass flow rate;
   determining a revised friction factor coefficient based on the Reynolds number;
   multiplying the revised friction factor coefficient by the mass flow constant and the square-root of the differential pressure to produce a revised mass flow rate;
   subtracting the revised mass flow rate from the calculated mass flow rate to produce a change in calculated mass flow rate; and repeating the step of determining a change in calculated mass flow rate while using the last revised mass flow rate as the calculated mass flow rate until the change in calculated mass flow rate is less than the convergence criterion.

4. The method of claim 3 wherein the friction factor coefficient is determined from the Reynolds number based on an empirical relationship between friction factor coefficient and the Reynolds number.

5. The method of claim 3 wherein the friction factor coefficient is determined from the Reynolds number based on a theoretical relationship between friction factor coefficient and the Reynolds number.

6. A method for calculating a mass flow rate of a fluid in a conduit, the method comprising:

measuring a temperature and pressure of the fluid;

determining a density and viscosity of the fluid based on the temperature and pressure;

selecting a friction factor coefficient;

measuring a differential pressure between two points in the fluid, the conduit having a substantially constant cross-sectional area between the two points;

multiplying the square-root of the differential pressure by a mass flow constant, the square-root of the density and the friction factor coefficient to produce a calculated mass flow rate;

selecting a convergence criterion;

determining a change in calculated mass flow rate by:
   determining a Reynolds number based on the viscosity and a calculated mass flow rate;
   determining a revised friction factor coefficient based on the Reynolds number;
   multiplying the revised friction factor coefficient by the mass flow constant, the square-root of the density and the square-root of the differential pressure to produce a revised mass flow rate;
   subtracting the revised mass flow rate from the calculated mass flow rate to produce a change in calculated mass flow rate; and
   repeating the step of determining a change in calculated mass flow rate while using the last revised mass flow rate as the calculated mass flow rate until the change in calculated mass flow rate is less than the convergence criterion.

* * * * *